(12) United States Patent
Suzuki et al.

(10) Patent No.: US 9,327,702 B2
(45) Date of Patent: May 3, 2016

(54) CALIPER BRAKE DEVICE FOR A VEHICLE

(75) Inventors: Tsutomu Suzuki, Kawasaki (JP);
Yoshiyuki Ookawara, Sagamihara (JP);
Yasushi Karino, Fussa (JP)

(73) Assignee: KYB Corporation, Tokyo (JP)

( * ) Notice: Subject to any disclaimer, the term of this patent is extended or adjusted under 35 U.S.C. 154(b) by 8 days.

(21) Appl. No.: 14/112,729

(22) PCT Filed: Apr. 19, 2012

(86) PCT No.: PCT/JP2012/060550
§ 371 (c)(1),
(2), (4) Date: Oct. 18, 2013

(87) PCT Pub. No.: WO2012/144549
PCT Pub. Date: Oct. 26, 2012

(65) Prior Publication Data
US 2014/0054117 A1    Feb. 27, 2014

(30) Foreign Application Priority Data
Apr. 21, 2011   (JP) .................................. 2011-094812

(51) Int. Cl.
*F16D 65/20*     (2006.01)
*B60T 15/54*     (2006.01)
(Continued)

(52) U.S. Cl.
CPC .................. *B60T 15/54* (2013.01); *B60T 15/22* (2013.01); *B60T 15/302* (2013.01); *B61H 5/00* (2013.01);
(Continued)

(58) Field of Classification Search
CPC ............ F16D 2121/02; F16D 2121/04; F16D 2121/08; F16D 65/18; F16D 55/228; F16K 17/196; B60T 8/1893

USPC .......... 303/22.6, 36; 188/72.4, 153 D, 153 A, 188/73.35, 73.36, 73.37; 137/493.9, 493.8, 137/512, 493
See application file for complete search history.

(56) References Cited

U.S. PATENT DOCUMENTS 1,832,393 A * 11/1931 Hildebrand ..................... 303/60
2,163,255 A *  6/1939 Klein et al. ............... 188/322.12
(Continued)

FOREIGN PATENT DOCUMENTS

JP    58166178  A  * 10/1983  .............. F16K 11/18
JP    62035123  A  *  2/1987  .............. F16D 65/54
(Continued)

OTHER PUBLICATIONS

International Search Report and Written Opinion corresponding to PCT/JP2012/060550, dated Jun. 12, 2012.
(Continued)

*Primary Examiner* — Anna Momper
*Assistant Examiner* — Stephen Bowes
(74) *Attorney, Agent, or Firm* — Hauptman Ham, LLP (57) ABSTRACT

A caliper brake device includes a brake shoe for exerting a friction force by sliding in contact with a disk, a caliper main body fixed to a vehicle and an actuator for pressing the brake shoe against the disk. The actuator includes an elastic film fixed to the caliper main body, a drive pressure chamber defined by the elastic film and supplied with a fluid, a valve introducing the fluid to the drive pressure chamber, and a piston interposed between the elastic film and the brake shoe. The fluid is supplied to the drive pressure chamber and the elastic film swells toward the brake shoe, whereby the piston brings the brake shoe into sliding contact with the disk. The valve introduces the fluid to the drive pressure chamber when the brake is applied while limiting the discharge of the fluid from the drive pressure chamber when the brake is released.

4 Claims, 5 Drawing Sheets

(51) Int. Cl.
  *B61H 5/00*   (2006.01)
  *F16D 65/00*  (2006.01)
  *F16D 65/18*  (2006.01)
  *F16D 55/224* (2006.01)
  *F16K 17/196* (2006.01)
  *B60T 15/22*  (2006.01)
  *B60T 15/30*  (2006.01)

(52) U.S. Cl.
  CPC ........ *F16D 55/2245* (2013.01); *F16D 65/0068* (2013.01); *F16D 65/0075* (2013.01); *F16D 65/183* (2013.01); *F16K 17/196* (2013.01)

(56) References Cited

U.S. PATENT DOCUMENTS

| | | | | |
|---|---|---|---|---|
| 2,934,080 | A * | 4/1960 | Rice | 137/98 |
| 3,067,770 | A * | 12/1962 | Fancher | 137/493 |
| 3,526,171 | A * | 9/1970 | Barnes | 92/98 D |
| 3,993,171 | A * | 11/1976 | Tonn | 188/72.4 |
| 4,867,280 | A * | 9/1989 | Von Gruenberg et al. | 188/72.4 |
| 5,950,670 | A * | 9/1999 | Flaim | 137/493.8 |
| 5,960,822 | A * | 10/1999 | Matuschka et al. | 137/493.8 |
| 6,230,851 | B1 * | 5/2001 | Yoshizawa et al. | 188/71.1 |
| 7,997,296 | B2 * | 8/2011 | Teng | 137/226 |
| 2008/0135110 | A1 * | 6/2008 | Vasquez et al. | 137/493.6 |
| 2010/0044167 | A1 * | 2/2010 | Suzuki et al. | 188/72.3 |
| 2011/0233009 | A1 | 9/2011 | Suzuki et al. | |

FOREIGN PATENT DOCUMENTS

| | | | | |
|---|---|---|---|---|
| JP | 8-226469 | A | | 9/1996 |
| JP | 8-226471 | A | | 9/1996 |
| JP | 11336813 | A * | 12/1999 | ............. F16D 65/32 |
| JP | 2009-162245 | A | | 7/2009 |
| JP | 2009162245 | A * | 7/2009 | |
| JP | 2011-047429 | A | | 3/2011 |
| WO | 2011/024980 | A1 | | 3/2011 |

OTHER PUBLICATIONS

Office Action mailed May 6, 2015, corresponding to Chinese patent application No. 201280018933.2.

* cited by examiner

CALIPER BRAKE DEVICE FOR A VEHICLE

RELATED APPLICATIONS

The present application is a National Phase of International Application Number PCT/JP2012/060550, filed Apr. 19, 2012, and claims priority from Japanese Application Number 2011-094812, filed Apr. 21, 2011.

TECHNICAL FIELD

The present invention relates to a caliper brake device for a vehicle, which applies a friction force to a disk rotating together with a wheel.

BACKGROUND ART

A hydraulic brake device is used as a brake device used in a railway vehicle or the like. Hydraulic brake devices disclosed in JP08-226469A and JP08-226471A include a pneumatic-hydraulic converter for converting an air pressure generated by air supplied from an air pressure source into a hydraulic pressure, and operate a brake by the hydraulic pressure supplied from the pneumatic-hydraulic converter via a hydraulic piping.

The weight and cost of the hydraulic brake device increase due to the presence of the pneumatic-hydraulic converter and the hydraulic piping. Thus, it is desired to equip a railway vehicle with a pneumatic brake for operating the brake by an air pressure without using a hydraulic pressure.

JP2009-162245A discloses a pneumatic brake device for railway vehicle which operates a brake shoe by an air pressure supplied to an actuator using a diaphragm.

SUMMARY OF INVENTION

In the conventional pneumatic caliper brake device, the brake shoe is brought into sliding contact with a disk by supplying air to the diaphragm and pressing a piston by an air pressure when the brake is applied. When the brake is released, air is discharged from the diaphragm to reduce the air pressure and the piston is moved backward by a biasing force of a return spring.

Since the pneumatic caliper brake device reduces the air pressure of the diaphragm when the brake is released, the piston is supported only by a supporting part surrounding the spring and the piston. In this case, there has been a problem that the piston in the caliper brake device vibrates due to vibration generated when the vehicle is in motion and, thereby, abrasion possibly occurs.

Against such a problem, it is also conceivable to change an air pressure control system so that a slight amount of air pressure remains in the diaphragm also when the brake is released. However, there has been a problem that this change causes a cost increase and a weight increase.

The present invention has been designated in consideration of those problems, and an object thereof is to provide a caliper brake device for vehicle which prevents abrasion caused by vibration without increasing cost and weight.

According to one aspect of the present invention, a caliper brake device for vehicle for applying a friction force to a disk rotating together with a wheel is provided. The caliper brake device includes a brake shoe for exerting a friction force by sliding in contact with the disk; a caliper main body fixed to a vehicle; and an actuator for pressing the brake shoe against the disk; wherein the actuator includes an elastic film that is fixed to the caliper main body, a drive pressure chamber that is defined by the elastic film and to that a fluid is supplied, a valve that introduces the fluid to the drive pressure chamber, and a piston that is interposed between the elastic film and the brake shoe; the fluid is supplied to the drive pressure chamber and the elastic film swells toward the brake shoe when the brake is applied, whereby the piston brings the brake shoe into sliding contact with the disk; the supply of the fluid to the drive pressure chamber is stopped and the elastic film slackens when braking is released, whereby the piston moves the brake shoe away from the disk; and the valve introduces the fluid to the drive pressure chamber when the brake is applied while limiting the discharge of the fluid from the drive pressure chamber when the brake is released.

An embodiment and advantages of the present invention are described in detail below with reference to the accompanying drawings.

DESCRIPTION OF EMBODIMENTS

Figure 1:
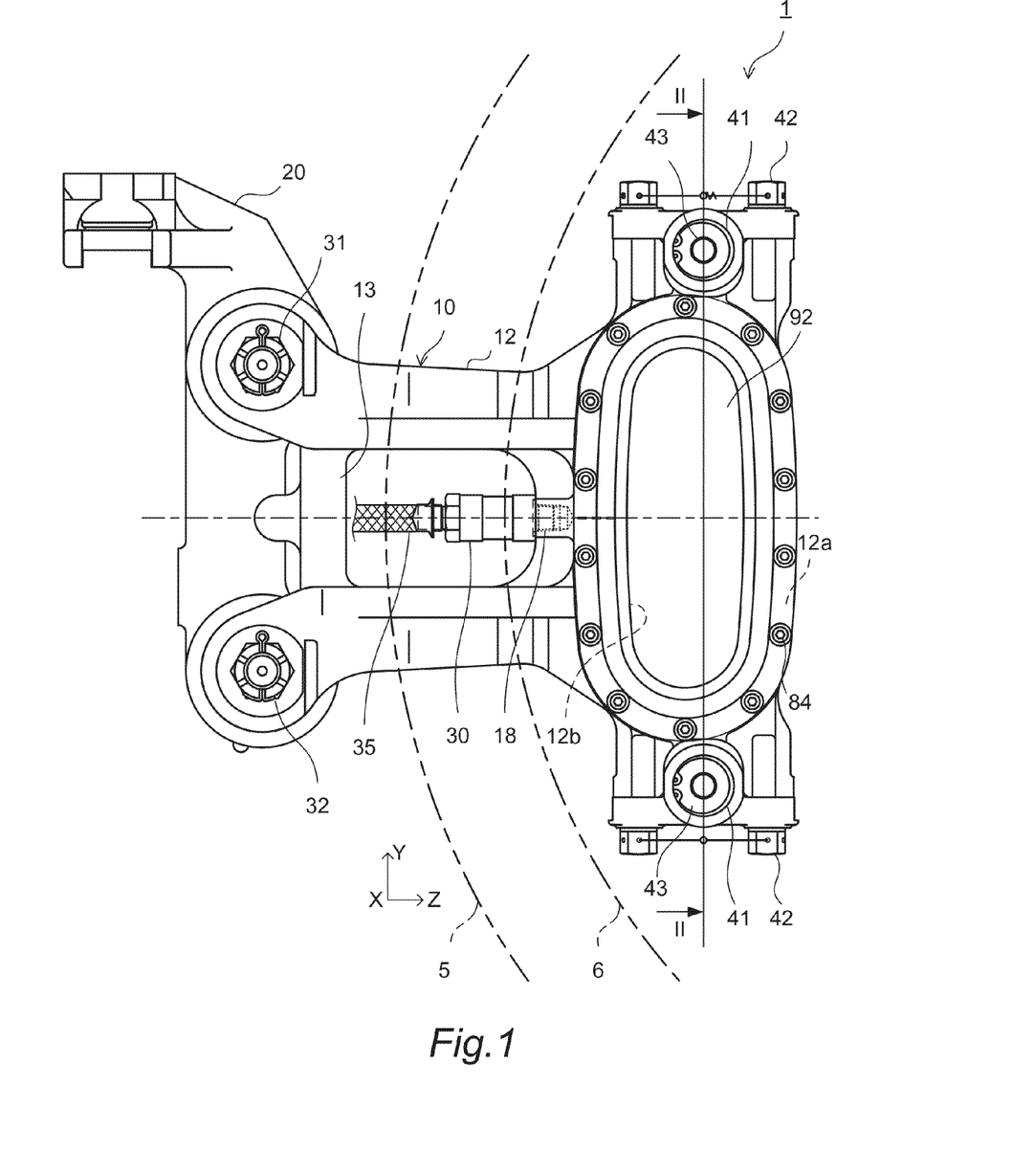
FIG. 1 is a side view of a caliper brake device of an embodiment of the present invention.
Figure 2:
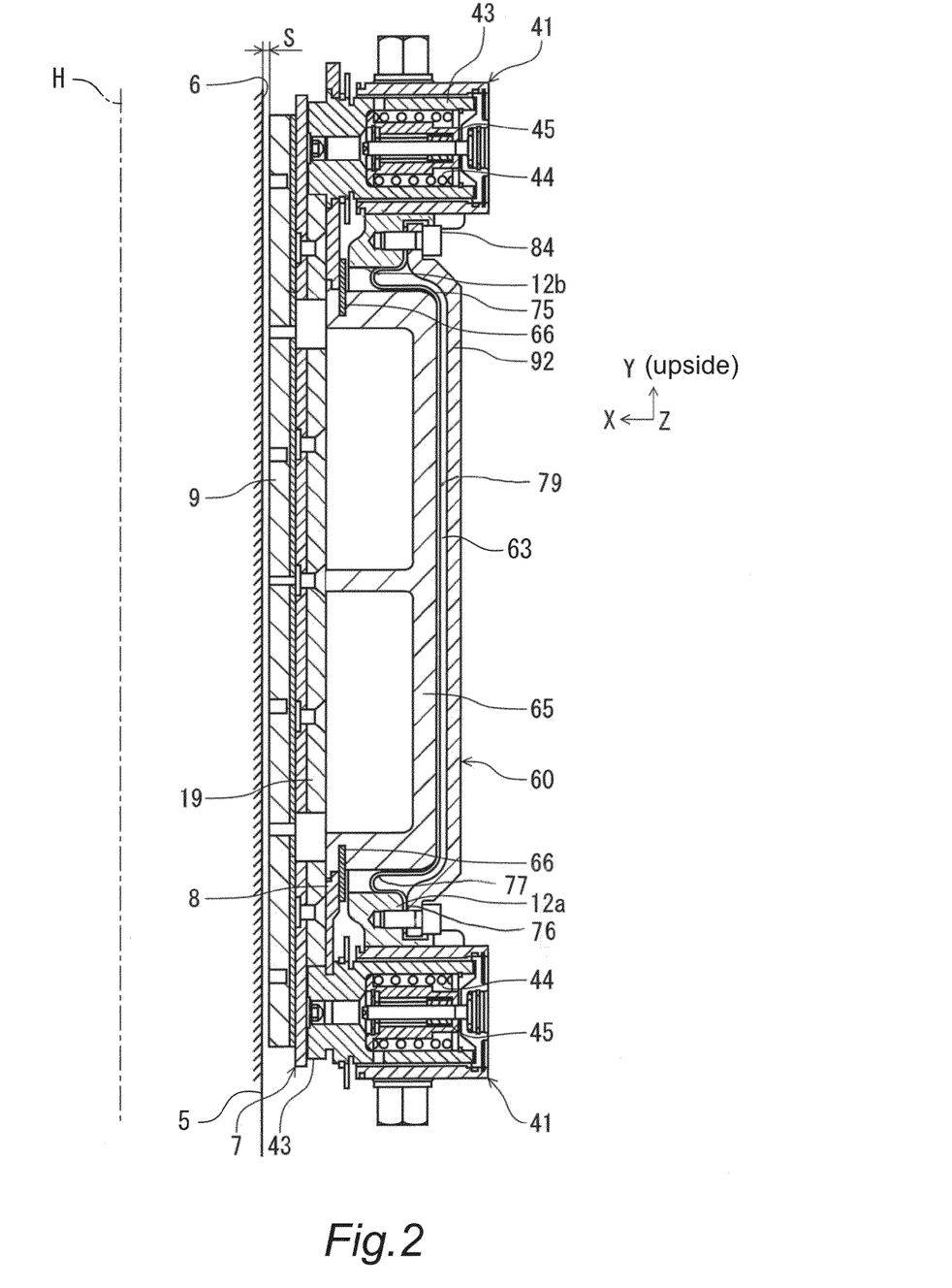
FIG. 2 is a sectional view of the caliper brake device of the embodiment of the present invention.

FIG. 1 is a side view of a caliper brake device 1 of an embodiment of the present invention, and FIG. 2 is a sectional view along line II-II of FIG. 1. The configuration of the caliper brake device 1 is described with three axes X, Y and Z perpendicular to each other set, wherein the X axis extends in a horizontal lateral direction, the Y axis extends in a vertical direction and the Z axis extends in a horizontal front-back direction. In FIG. 2, denoted by H is a center line of a wheel 5.

The caliper brake device 1 mounted in a railway vehicle brakes the rotation of the wheel 5 by sandwiching a disk 6 of the wheel 5 between a pair of brake shoes 7.

A caliper main body 10 is supported on a supporting frame 20 fixed to an unillustrated carriage (vehicle body) of the railway vehicle in a floating manner so as to be slidable in an X-axis direction by upper and lower slide pins 31, 32.

The caliper main body 10 includes a pair of caliper arms 12 extending to straddle the disk 6 of the wheel 5 and a yoke portion 13 connecting the left and right caliper arms 12.

An adjuster 41 is fastened to each of upper and lower end parts of the right caliper arm 12 via anchor bolts 42. The upper and lower adjusters 41 include an anchor pin 43 projecting in the X-axis direction. Both end parts of the brake shoe 7 and a supporting plate 8 are respectively supported via the anchor pins 43.

The brake shoe 7 includes a lining 9 as a friction member which slides in contact with the disk 6 and a lining back plate 19 which is made of metal and to which a back part of the lining 9 is attached.

The brake shoe 7 is supported by the supporting plate 8 via the anchor pins 43. The brake shoe 7 is supported movably back and forth relative to the disk 6 by engaging the upper and lower end parts of the supporting plate 8 with the respective anchor pins 43, and a brake reaction force is supported by engaging upper and lower end parts of the lining back plate 19 with the respective anchor pins 43.

A rubber boot (not shown) for covering an exposed part of the anchor pin 43 is mounted on the adjuster 41 to protect the adjuster 41 with the boot from dust.

The adjuster 41 includes a return spring 44 for biasing the brake shoe 7 in a direction away from the disk 6 via the anchor pin 43 and a clearance adjusting mechanism 45 for adjusting a clearance S between the brake shoe 7 and the disk 6 to be substantially constant when the brake is released.

When the brake is released, the brake shoe 7 is moved away from the disk 6 by biasing forces of the return springs 44 and the clearance S between the brake shoe 7 and the disk 6 is kept substantially constant by the clearance adjusting mechanisms 45.

The unillustrated left caliper arm is integrally formed with a supporting rail. The supporting rail is formed with a dovetail groove, and a lining back plate of the left brake shoe is inserted into the dovetail groove. The brake shoe is inserted into the supporting rail, and the upper and lower ends thereof are engaged with anchor blocks to be retained and fixed to the left caliper arm.

The right caliper arm 12 is provided with an actuator 60 for pressing the brake shoe 7 toward the disk 6 via the supporting plate 8. The actuator 60 is arranged between the respective adjusters 41.

Air as a fluid is supplied to a drive pressure chamber 63 of the actuator 60 from an air pressure source mounted in the railway vehicle, and an elastic film 75 presses the brake shoe 7 via a piston 65 by an air pressure as a fluid pressure.

The actuator 60 includes a housing wall 12b formed in the caliper arm 12, the elastic film 75 mounted on the housing wall 12b, a cover 92 fastened to the housing 12b, the drive pressure chamber 63 defined between the housing wall 12b, the elastic film 75 and the cover 92, and the piston 65 interposed between the elastic film 75 and the brake shoe 7. The air pressure is increased by the air introduced to the drive pressure chamber 63 and the elastic film 75 presses the brake shoe 7 in the X-axis direction, whereby the brake shoe 7 is pressed against the disk 6.

As shown in FIG. 1, the housing wall 12b is in the form of an elliptical cylindrical surface penetrating through the caliper arm 12. The housing wall 12b is formed to have a substantially elliptical cross-section facing the lining 9 over a wide range.

Without being limited to this, the housing wall 12b may be shaped to have an arcuate cross-section extending along the lining 9.

The caliper arm 12 includes an annular mounting seat 12a extending along an opening edge part of the housing wall 12b. A plurality of screw holes are formed at predetermined intervals on the mounting seat 12a, and the cover 92 is fastened via bolts 84 screwed into the respective screw holes. A peripheral edge portion 76 of the elastic film 75 is sandwiched between the mounting seat 12a and the cover 92.

The cover 92 has a substantially elliptical outer shape similarly to the mounting seat 12a. A part of the cover 92 defining the drive pressure chamber 63 has a concave dish-like shape.

The elastic film 75 is made of an elastic resin material. The elastic film 75 may be formed into bellows using a composite material of an elastic resin material and a reinforcing material, for example, such as carbon fibers or Kepler fibers. The elastic film 75 may also be formed using bellows made of a metal thin plate, a rubber tube or a diaphragm.

The elastic film 75 includes the peripheral edge portion 76 sandwiched between the mounting seat 12a and the cover 92, a bellows portion 77 which extends and contracts along the housing wall 12b, and a pressing portion 79 facing the brake shoe 7.

The piston 65 is interposed between the pressing portion 79 of the elastic film 75 and the brake shoe 7. The piston 65 comes into contact with the brake shoe 7 through an opening formed in the supporting plate 8 to transmit a movement of the elastic film 75 to the brake shoe 7. The piston 65 is fastened to the supporting plate 8 via a key 66.

The caliper arm 12 includes an inlet portion 18. An air pressure piping 35 communicating with the unillustrated air pressure source and a residual pressure valve 30 for introducing air supplied from the air pressure piping 35 to the inlet portion 18 are connected to the inlet portion 18. Pressurized air from the air pressure source is supplied from the air pressure piping 35 via an unillustrated switching valve to the drive pressure chamber 63 via the residual pressure valve 30 and the inlet portion 18. The switching valve operates in response to a command from an unillustrated controller and introduces the pressurized air from the air pressure source to the drive pressure chamber 63 when the brake is applied while introducing an atmospheric pressure to the drive pressure chamber 63 when the brake is released.

Next, the operation of the caliper brake device 1 is described.

When the brake is applied, the air pressure is increased by the air introduced from the inlet portion 18 to the drive pressure chamber 63, whereby the elastic film 75 swells toward the brake shoe 7 and presses the brake shoe 7 against the disk 6 via the piston 65. This causes the brake shoe 7 to apply a friction force to the disk 6 to brake the rotation of the wheel 5.

When the brake is released, the air in the drive pressure chamber 63 is discharged from the inlet portion 18 and the air pressure is reduced to a level lower than that when the brake is applied, whereby the elastic film 75 slackens, the bellows portion 77 and the pressing portion 79 contract, and the brake shoe 7 is moved away from the disk 6 by the biasing forces of the return springs 44. At this time, the clearance S between the brake shoe 7 and the disk 6 is adjusted to be substantially constant by the clearance adjusting mechanisms 45.

In this way, in the caliper brake device 1, the air in the drive pressure chamber 63 is discharged from the inlet portion 18 and the air pressure of the drive pressure chamber 63 decreases when the brake is released. As the air pressure decreases, the bellows portion 77 and the pressing portion 79 of the elastic film 75 contract and the piston 65 is released from pressing. At this time, the piston 65 is moved away from the disk 6 by the biasing forces of the return springs 44.

In the conventional pneumatic brake, the air pressure of the drive pressure chamber 63 becomes substantially equal to an atmospheric pressure and the piston 65 is biased toward a brake release side by the biasing forces of the return springs 44.

At this time, the piston 65 is not pressed by the bellows portion 77 and the pressing portion 79 of the elastic film 75. Thus, if vibration is applied to the caliper brake device 1, the piston 65 vibrates and constituent components of the caliper brake device 1 including the piston 65 may be abraded or broken.

Against such a problem, it is conceivable to add a mechanism for controlling the air pressure from the air pressure source of the vehicle also when the brake is released. However, the addition of this mechanism requires a drastic change in a brake system and leads to a cost and a weight increase.

Accordingly, in the embodiment of the present invention, the abrasion and breakage of the caliper brake device 1 caused by vibration are prevented without largely increasing cost and weight by a characteristic configuration as described next.

In the embodiment of the present invention, the residual pressure valve 30 for introducing the air supplied from the air pressure piping 35 to the inlet portion 18 is connected to the caliper arm 12 as shown in FIG. 1. By a configuration described below, the residual pressure valve 30 limits the discharge of the air from the drive pressure chamber 63 to keep the air pressure of the drive pressure chamber 63 and prevent the vibration of the piston 65 during a brake release period during which no air is supplied from the air pressure piping 35.

Figure 3:
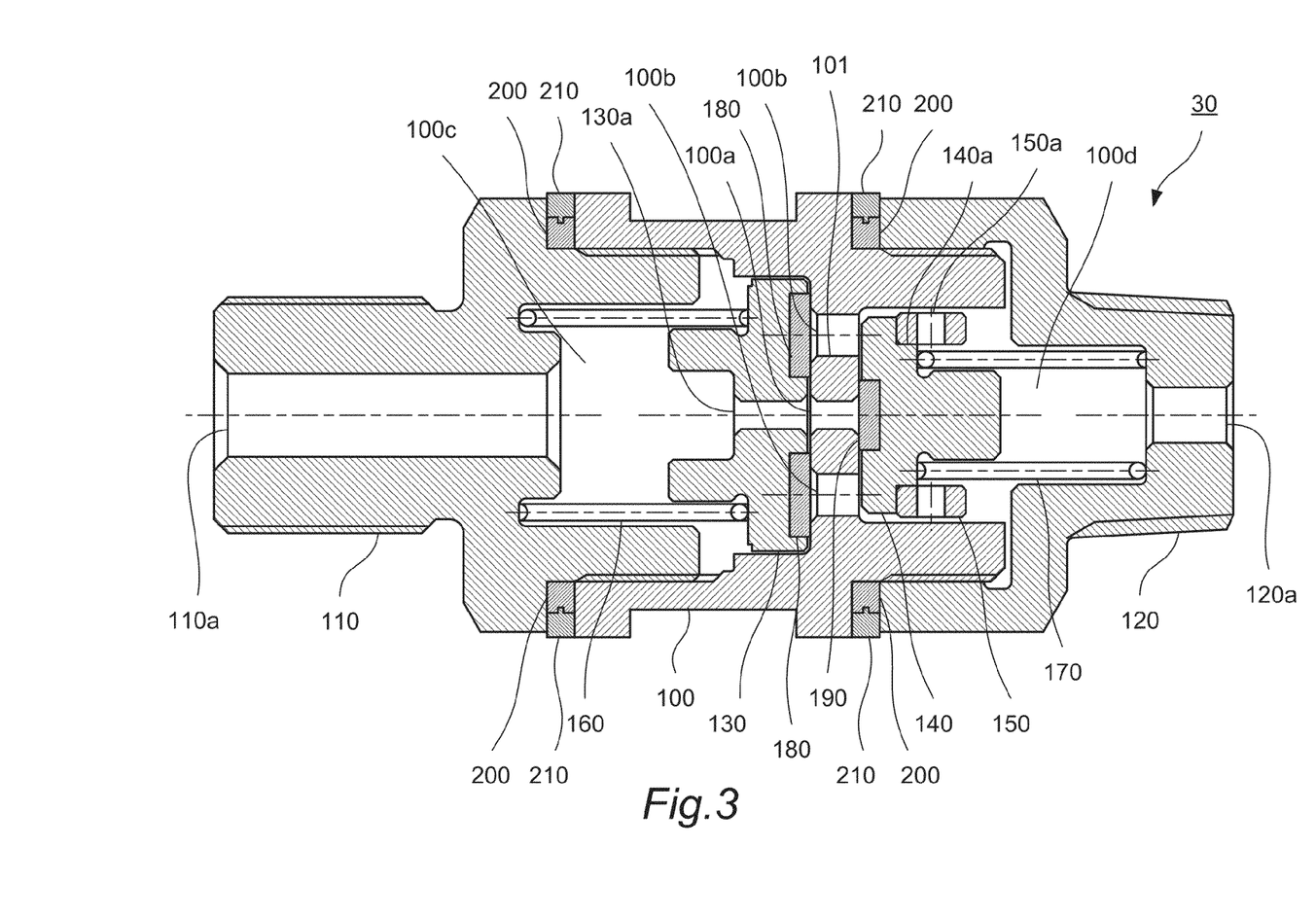
FIG. 3 is a sectional view of a residual pressure valve of the embodiment of the present invention.

FIG. 3 is a sectional view showing the residual pressure valve 30 of the embodiment of the present invention.

The residual pressure valve 30 has a substantially cylindrical outer shape and includes an inlet port 110 connected to the air pressure piping 35 and a caliper side port 120 connected to the inlet portion 18.

The residual pressure valve 30 is formed by connecting a valve housing 100, the inlet port 110 with a vent hole 110a and the caliper side port 120 with a vent hole 120a in an axial direction. The inlet port 110 and the caliper side port 120 are respectively fixed to the valve housing 100 by threadable engagement.

A seat member 200 and a packing 210 are respectively interposed between the inlet port 110 and the valve housing 100 and between the caliper side port 120 and the valve housing 100 to prevent the leakage of passing air.

The valve housing 100 has a cylindrical outer shape and is internally formed with a hollow portion. The valve housing 100 is formed with a partition wall 101 which divides the hollow portion inside the valve housing 100 into a first hollow portion 100c and a second hollow portion 100d in the axial direction. The cylindrical first hollow portion 100c and the cylindrical second hollow portion 100d are respectively formed at the inlet port 100 side and at the caliper side port 120 side of the partition wall 101. The first hollow portion 100c is open toward the vent hole 110a. The second hollow portion 100d is open toward the vent hole 120a.

A second vent hole 100a penetrates through the partition wall 101 in the center. A plurality of vent holes 100b penetrate around the second vent hole 100a.

The inlet port 110 with the vent hole 110a is threadably engaged with the valve housing 100. An open part of the first hollow portion 100c is sealed by the inlet port 110, whereas the first hollow portion 100c communicates with the vent hole 110a. In the first hollow portion 100c, a first valve seat 130 is provided slidably in the axial direction. The first valve seat 130 is biased toward the vent hole 120a by a first spring 160.

A vent hole 130a penetrates through the first valve seat 130 in a central part thereof. The vent hole 130a communicates with the second vent hole 100a.

The first valve seat 130 includes a seat member 180 in a part facing the first vent hole 100b. The seat member 180 closes the first vent hole 100b when the first valve seat 130 is closed and held in contact with the partition wall 101.

The caliper side port 120 with the vent hole 120a is threadably engaged with the valve housing 100. An open part of the second hollow portion 100d is sealed by the caliper side port 120, and the second hollow portion 100d communicates with the vent hole 120a. In the second hollow portion 100d, a second valve seat 140 is provided slidably in the axial direction. The second valve seat 140 is biased toward the vent hole 110a by a second spring 170.

A step portion 140a having a diameter smaller than an outer diameter of the second valve seat 140 is formed on the vent hole 120a side of the second valve seat 140. A spacer 150 is fitted around the step portion 140a. The spacer 150 is mounted in the second hollow portion 100d so that a clearance is formed between the spacer 150 and the inner wall of the valve housing 100. A vent hole 150a penetrates through the spacer 150. By the vent hole 150a of the spacer 150 or the clearance between the spacer 150 and the inner wall of the valve housing 100, the first vent hole 100b formed in the partition wall 101 and the vent hole 120a communicate in the second hollow portion 100d regardless of the position of the second valve seat 140.

The second valve seat 140 includes a seat member 190 in a part facing the second vent hole 100a. The seat member 190 closes the second vent hole 100a when the second valve seat 140 is closed and held in contact with the partition wall 101.

Next, the operation of the residual pressure valve 30 thus configured is described.

Figure 4:
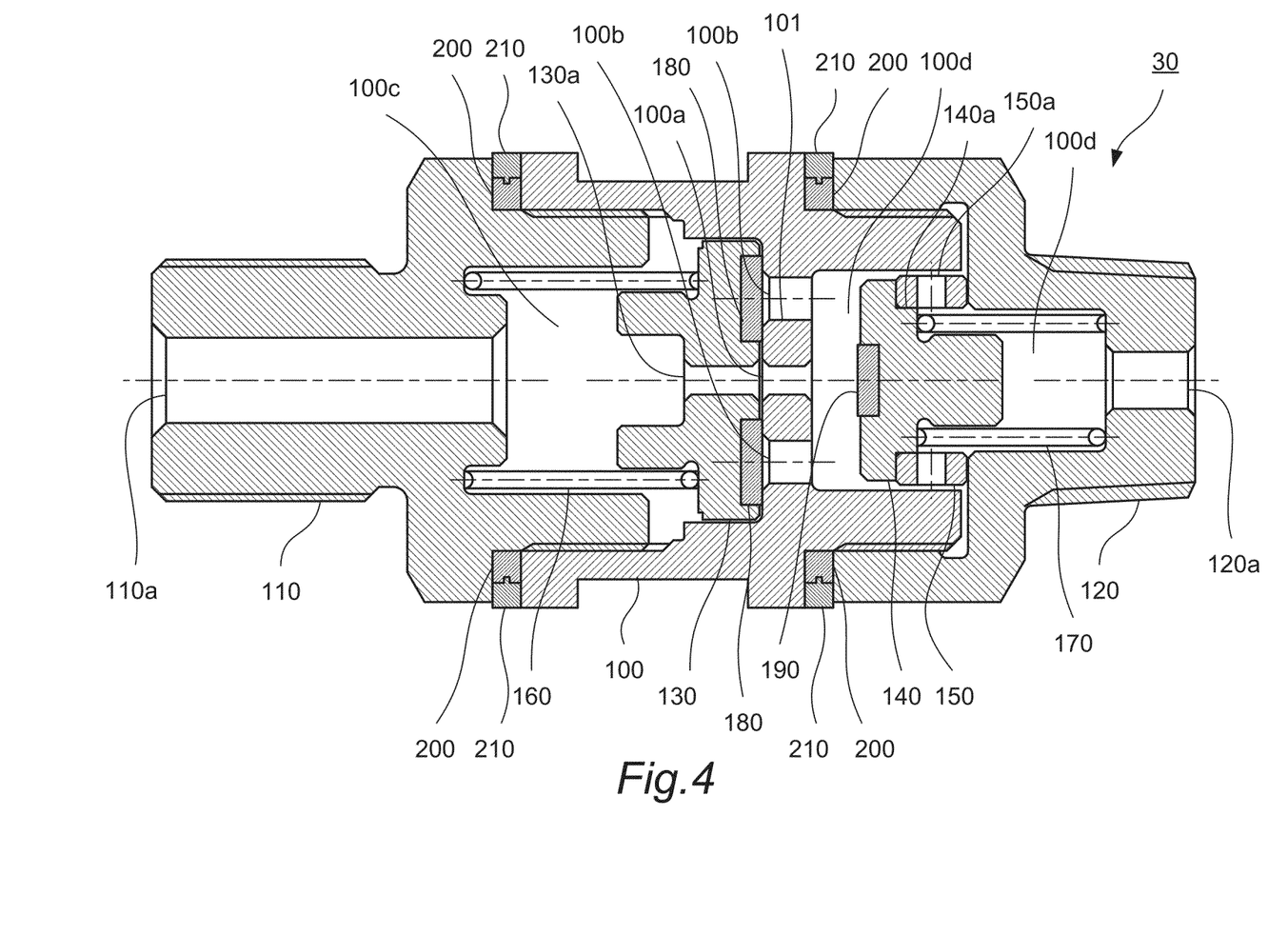
FIG. 4 is a sectional view of the residual pressure valve of the embodiment of the present invention when the brake is applied.

FIG. 4 is a diagram of the residual pressure valve 30 of the embodiment of the present invention when the brake is applied.

When the brake is applied, the air from the unillustrated air pressure source is supplied to the drive pressure chamber 63 of the caliper brake device 1 via the air pressure piping 35 and the residual pressure valve 30 shown in FIG. 1.

At this time, the air is supplied from the vent hole 110a to the vent hole 120a in the residual pressure valve 30. The first valve seat 130 is held in contact with the partition wall 101 by a biasing force of the first spring 160 and the air pressure of the supplied air.

When the air pressure by the air supplied from the second vent hole 100a communicating with the vent hole 130a exceeds a biasing force of the second spring 170, the second valve seat 140 slides toward the vent hole 120a.

The air passes from the second vent hole 100a through the clearances between the spacer 150 and the inner wall of the valve housing 100, and between the second valve seat 140 and the valve housing 100, and the vent hole 150a of the spacer 150 and is discharged to the vent hole 120a. The air discharged from the vent hole 120a is supplied from the inlet portion 18 shown in FIG. 1 to the drive pressure chamber 63 to press the piston 65, whereby the brake shoe 7 slides in contact with the disk 6 to brake the wheel 5.

Figure 5:
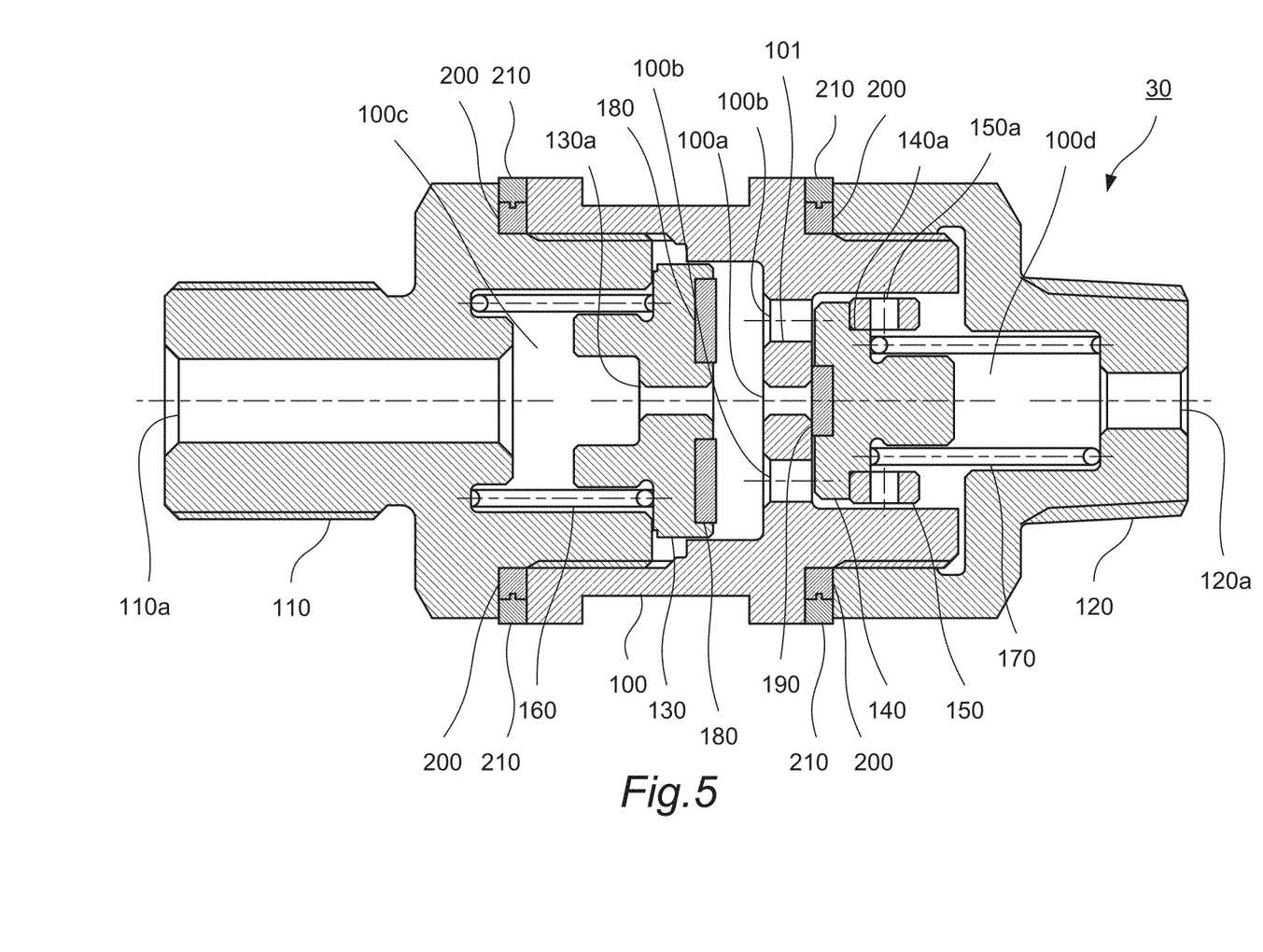
FIG. 5 is a sectional view of the residual pressure valve of the embodiment of the present invention when the brake is released.

FIG. 5 is a diagram of the residual pressure valve 30 of the embodiment of the present invention when the brake release starts.

When the brake is released, the air pressure piping 35 is opened to the atmospheric pressure and the air in the drive pressure chamber 63 is discharged as described above.

At this time, in the residual pressure valve 30, the air passes from the vent hole 120a toward the vent hole 110a. The second valve seat 140 comes into contact with the partition wall 101 by the biasing force of the second spring 170 and the air pressure of the passing air. In this state, the second hollow portion 100d and the first vent hole 100b communicate and the air passing through the residual pressure valve 30 passes through the first vent hole 100b to press the first valve seat 130 toward the vent hole 110a.

When the air pressure by the air passing through the first vent hole 100b exceeds the biasing force of the first spring 160, the first valve seat 130 slides toward the vent hole 110a. Therefore, the air passes from the vent hole 120a through the clearance between the spacer 150 and the inner wall of the valve housing 100, the vent hole 150a of the spacer 150, the clearance between the second valve seat 140 and the valve housing 100, the first vent hole 100b and the vent hole 130a and is output to the vent hole 110a. In this state, the air pressure of the drive pressure chamber 63 is reduced by way of the residual pressure valve 30.

When the air pressure of the drive pressure chamber 63 is reduced and the air pressure by the air passing through the first vent hole 100b falls to or below the biasing force of the first spring 160, the first valve seat 130 slides toward the vent hole 120a by the biasing force of the first spring 160 and comes into contact with the partition wall 101 (see FIG. 3). When the first valve seat 130 is brought into contact with the partition wall 101 by the biasing force of the first spring 160, no more air is discharged from the drive pressure chamber 63 and the drive pressure chamber 63 is kept at a constant pressure.

At this time, a certain amount of air remains in the drive pressure chamber 63, whereby a force is applied to the piston 65 in a direction to press the brake shoe 7 by the air pressure and, simultaneously, the brake shoe 7 is biased in a direction away from the disk 6 by the biasing forces of the return springs 44. Accordingly, the piston 65 is pressed by a force in a positive and a negative direction on the X axis, wherefore the vibration of the piston 65 relative to the caliper arm 12 is suppressed even when the caliper brake device 1 vibrates. When the air in the drive pressure chamber 63 is not discharged by the residual pressure valve 30 after the brake release as shown in FIG. 3, the air pressure of the drive pressure chamber 63 is set at a pressure which is smaller than the biasing forces of the return springs 44 so as not to cause the piston 65 to vibrate. The pressure at this time differs depending on the configuration of the caliper brake device 1, but is set, for example, at about 0.02 to 0.03 [Pa].

As described above, the caliper brake device 1 of the embodiment of the present invention is composed of the brake shoes 7 for applying a friction force by sliding in contact with the disk 6 rotating together with the wheel 5, the caliper arms 12 supported on the vehicle and the actuator 60 for pressing the brake shoe 7 against the disk 6. The actuator 60 includes the elastic film 75 which is fixed to the caliper arm 12, the drive pressure chamber 63 which is defined by the elastic film 75 and to which air is supplied when the brake is applied, the residual pressure valve 30 which introduces the air to the drive pressure chamber, and the piston 65 which is interposed between the elastic film 75 and the brake shoe 7. The residual pressure valve 30 introduces the air to the drive pressure chamber 63 when the brake is applied while limiting the discharge of the air from the drive pressure chamber 63 when the brake is released.

Therefore, the residual pressure valve 30 can leave a certain amount of air in the drive pressure chamber 63 by limiting the discharge of the air from the drive pressure chamber 63 when the brake is released. This can maintain the swell of the elastic film 75 to an extent that the piston 65 does not bring the brake shoe 7 into sliding contact with the disk 6 and the piston 65 is pressed by the remaining air pressure even after the release of the brake. Thus, it is possible to prevent the vibration of the piston 65 in the caliper arm 12 and prevent the abrasion and breakage of the caliper brake device 1 due to vibration.

The residual pressure valve 30 includes the first valve seat (first valve body) 130 biased toward the vent hole 120a by the first spring 160 and the second valve seat (second valve body) 140 biased toward the vent hole 110a by the second spring 170. The air is supplied to the drive pressure chamber 63 when the second valve seat 140 opens the second vent hole 100a, the air is discharged from the drive pressure chamber 63 when the first valve seat 130 opens the first vent hole 100b, and the discharge of the air from the drive pressure chamber 63 is limited when the first valve seat 130 and the second valve seat 140 close both the second vent hole 100a and the first vent hole 100b.

Therefore, the discharge of the air from the drive pressure chamber 63 can be limited only by the configuration of the residual pressure valve 30 without changing the caliper brake device 1 and the other configuration, and the abrasion and breakage of the caliper brake device 1 due to vibration can be prevented without increasing cost and weight. The residual pressure valve 30 is composed of the first valve seat 130 and the second valve seat 140 biased by the first spring 160 and the second spring 170 in the valve housing 100, and can be formed to have a diameter substantially equal to the diameter of the air pressure piping 35. Thus, the outer shape of the residual pressure valve 30 is not enlarged, wherefore the discharge of the air from the drive pressure chamber 63 can be limited without changing the existing caliper brake device 1 and other constituent components.

In the residual pressure valve 30, the first valve seat 130 is opened to discharge the air from the drive pressure chamber 63 if the air pressure by the air discharged from the drive pressure chamber 63 exceeds the biasing force of the first spring 160 when the brake is released. The first valve seat 130 is closed to stop the discharge of the air from the drive pressure chamber 63 if the air pressure by the air discharged from the drive pressure chamber 63 falls to or below the biasing force of the first spring 160.

Therefore, the discharge of the air from the drive pressure chamber 63 can be limited only by a mechanical movement of the residual pressure valve 30 and the abrasion and breakage of the caliper brake device 1 due to vibration can be prevented without increasing cost.

The residual pressure valve 30 is formed with the first vent hole 100b that is closed regardless of whether the second valve seat 140 is open or closed when the first valve seat 130 is closed and the second vent hole 100a that is closed regardless of whether the first valve seat 130 is open or closed when the second valve seat 140 is closed. When the brake is applied, the second valve seat 140 is opened against the biasing force of the second spring 170 due to the air passing through the first vent hole 100b. When the brake is released, the first valve seat 130 is opened against the biasing force of the first spring 160 due to the air passing through the second vent hole 100a.

Therefore, the discharge of the air from the drive pressure chamber 63 can be limited only by a mechanical movement of the residual pressure valve 30. The first and second vent holes 100a, 100b have an orifice structure and can increase the air pressure due to the air passing through an orifice part and open and close the first valve seat 130 and the second valve seat 140. This can prevent the abrasion and breakage of the caliper brake device 1 due to vibration without increasing cost.

Since the residual pressure valve 30 is configured to be easily detachable from the caliper arm 12, the usage of the residual pressure valve 30 detached is possible if it is not necessary to leave the air pressure in the drive pressure chamber 63 when the brake is released.

Although the above embodiment of the present invention has been described, taking the pneumatic caliper brake device 1 as an example, the vibration of a hydraulic piston may be prevented by applying the residual pressure valve of this embodiment to a hydraulic caliper brake device and keeping an internal pressure of a hydraulic piston chamber.

Although the embodiment of the present invention has been described above, the above embodiment merely indicates some application examples of the present invention and is not meant to limit the technical scope of the present invention to the specific configuration of the above embodiment.

The present application claims a priority based on Japanese Patent Application No. 2011-94812 filed with the Japan Patent Office on Apr. 21, 2011, all the contents of the application are incorporated herein by reference.

Exclusive nature or features of the embodiments of this invention are claimed as follows.

The invention claimed is:

1. A caliper brake device for applying a friction force to a disk rotating together with a wheel of a vehicle, the caliper brake device comprising:
   a brake shoe configured to exert a friction force by contact with the disk;
   a caliper main body configured to be fixed to a body of the vehicle; and
   an actuator configured to press-the brake shoe against the disk;
   wherein
   the actuator includes:
      an elastic film fixed to the caliper main body,
      a drive pressure chamber defined by the elastic film and configured to receive a fluid supplied to said drive pressure chamber,
      a valve configured to introduce the fluid to the drive pressure chamber,
      a piston interposed between the elastic film and the brake shoe, and
      a return spring configured to bias the brake shoe in a direction away from the disk;
   when the brake is applied, the valve is configured to supply the fluid to the drive pressure chamber and the elastic film is configured to swell toward the brake shoe to cause the piston to bring the brake shoe into contact with the disk;
   when the brake is released, the valve is configured to stop the supply of the fluid to the drive pressure chamber, the elastic film is configured to slacken, and the return spring is configured to bias the brake shoe away from the disk to cause the piston to move the brake shoe away from the disk;
   the valve is configured to introduce the fluid to the drive pressure chamber when the brake is applied and limit the discharge of the fluid from the drive pressure chamber when the brake is released; and
   after the brake is released, the valve is configured to limit the discharge of the fluid and to keep a pressure of the fluid in the drive pressure chamber at a pressure which exerts a force that is smaller than a biasing force of the return spring so as not to cause the piston to vibrate,
   wherein after the brake is released, the valve is configured to keep the pressure of the fluid in the drive pressure chamber at a level sufficient to cause the elastic film to partially swell to an extent that the piston does not bring the brake shoe into contact with the disk.

2. The caliper brake device according to claim 1, wherein the valve includes:
   a hollow portion;
   a partition wall which divides the hollow portion, in an axial direction, into a first hollow portion and a second hollow portion, and includes a first vent hole and a second vent hole;
   a first valve body provided in the first hollow portion and configured to close the first vent hole by coming into contact with the partition wall; and
   a second valve body provided in the second hollow portion and configured to close the second vent hole by coming into contact with the partition wall; and
   the valve is configured such that,
      the fluid is supplied to the drive pressure chamber via the second vent hole when the second vent hole is opened by the second valve body;
      the fluid is discharged from the drive pressure chamber via the first vent hole when the first vent hole is opened by the first valve body; and
      the discharge of the fluid from the drive pressure chamber is limited when both the first vent hole and the second vent hole are closed by the first valve body and the second valve body, respectively.

3. The caliper brake device according to claim 2, wherein the valve further includes:
   a first spring configured to bias the first valve body toward the partition wall; and
   the valve is configured such that, when the brake is released,
      the first vent hole is opened by the first valve body and the fluid is discharged from the drive pressure chamber when the pressure of the fluid discharged from the drive pressure chamber exceeds a biasing force of the first spring, and
      the first vent hole is closed by the first valve body and the discharge of the fluid from the drive pressure chamber is stopped when the pressure of the fluid discharged from the drive pressure chamber falls to or below the biasing force of the first spring.

4. The caliper brake device according to claim 3, wherein the valve is configured such that, when the brake is released, the first valve body opens the first vent hole against the biasing force of the first spring due to the pressure of the fluid passing through the first vent hole.

\* \* \* \* \*